United States Patent
Misenheimer et al.

(10) Patent No.: US 7,048,476 B2
(45) Date of Patent: May 23, 2006

(54) CUTTER HEAD BLADE CLAMP

(75) Inventors: Kevin L. Misenheimer, Morristown, TN (US); Anthony W. Johnson, Taylorsville, NC (US); Amir R Rashidi, Newton, NC (US)

(73) Assignee: Misenheimer Saw & Tool, Inc., Morristown, TN (US)

( * ) Notice: Subject to any disclaimer, the term of this patent is extended or adjusted under 35 U.S.C. 154(b) by 84 days.

(21) Appl. No.: 10/855,216

(22) Filed: May 27, 2004

(65) Prior Publication Data

US 2005/0265795 A1    Dec. 1, 2005

(51) Int. Cl.
    *B23P 15/30* (2006.01)
(52) U.S. Cl. .............. 407/67; 407/94; 407/95
(58) Field of Classification Search .......... 407/67, 407/94, 95, 41, 44
    See application file for complete search history.

(56) References Cited

U.S. PATENT DOCUMENTS

| | | | |
|---|---|---|---|
| 1,700,333 A | 1/1929 | Pond | |
| 3,887,975 A | 6/1975 | Sorice et al. | |
| 4,363,576 A | 12/1982 | Zweekly | |
| 4,557,305 A | 12/1985 | Berger et al. | |
| 4,592,680 A * | 6/1986 | Lindsay | 407/36 |
| 4,708,536 A * | 11/1987 | Sullivan | 407/41 |
| 5,059,068 A | 10/1991 | Scott | |
| 5,176,191 A | 1/1993 | Owens | |
| 5,647,699 A | 7/1997 | Martin et al. | |
| 6,004,079 A * | 12/1999 | Kislinger | 407/34 |
| 6,071,045 A | 6/2000 | Janness | |
| 6,161,602 A | 12/2000 | Erbs | |

* cited by examiner

*Primary Examiner*—Willmon Fridie, Jr.
(74) *Attorney, Agent, or Firm*—Pitts & Brittian, P.C.

(57) ABSTRACT

A cutter head with at least one insert clamp. Each insert clamp includes a wedge member fastened to the cutter head. The cutter head includes an insert slot, a clamping slot, and a threaded aperture. The wedge member, in one embodiment, is wedge shaped and includes a thru-opening. A fastener engages the threaded aperture in the cutter head and passes through the thru-opening in the clamping member. A cutter insert fits into the insert slot in the cutter head, and the wedge member secures the cutting insert against a surface of the cutter head.

15 Claims, 3 Drawing Sheets

CUTTER HEAD BLADE CLAMP

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a cutting tool for use in a rotary power tool. More particularly, the invention relates to a rotary cutter head for releasably holding cutting blades formed with cutting edges which extend radially outwardly from and generally axially along the outer periphery of the cutter head. Cutter heads of this general type are typically used in power machines such as routers, edgebanders, or tenoners and are typically used to chamfer, round, or otherwise shape an edge portion of a workpiece of either ferrous or non-ferrous material.

2. Description of the Related Art

Rotary cutting tools consist of a disc-like body having disposable cutting inserts protruding radially from the disc periphery. The cutting inserts are held firmly to the disc body when in use, but must be readily removable for replacement when the cutting edge of the insert is blunted or broken.

There have been many proposals in relation to the manner in which the cutting inserts are held in the body. Such proposals include cutting inserts held in place in the cutting body by some form of separate retaining means. Typical forms of construction falling in this first category are described and illustrated in U.S. Pat. No. 1,700,333, issued to Pond; U.S. Pat. No. 3,887,975, issued to Sorice, et al.; U.S. Pat. No. 4,363,576, issued to Zweekly, and U.S. Pat. No. 5,647,699, issued to Martin, et al.

The Pond and Sorice, et al., patents set forth arrangements utilizing camming members which bear against appropriately shaped portions of the cutting inserts to achieve clamping. The Zweekly patent shows a camming arrangement which bears against a clamping blade which in turn bears against the insert. This blade is welded into the body to ensure integrity of position. The Martin, et al., patent discloses a cutter head forming an integral clamp that secures the insert.

BRIEF SUMMARY OF THE INVENTION

According to one embodiment of the present invention, a cutter head with at least one insert clamp is provided. The insert clamp includes a clamping member fastened to the cutter head. The insert fits into a slot in the cutter head, and the clamping member secures the cutting insert against a surface of the cutter head.

The cutter head includes an insert slot, a clamping slot, and a threaded aperture. The clamping member, in one embodiment, is wedge shaped and includes a thru-opening. A fastener engages the threaded aperture in the cutter head and passes through the thru-opening in the clamping member. In one embodiment, the thru-opening is threaded with an opposing thread and the fastener has opposing threads on distal ends whereby the fastener, when rotated in one direction, draws the clamping member to the cutter head. In another embodiment, the thru-opening is sized to accommodate the fastener, which has a shoulder that engages an outer surface of the clamping member, thereby drawing the clamping member toward the cutter head when the fastener is rotated in one direction. In one embodiment, the cutter head includes a stop adjacent the insert slot whereby the stop aids in aligning the insert in relation to the cutter head.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for clamping an insert in a cutter head is disclosed. Cutter heads are commonly used to shape wood and other material. Typically, the cutter head has cutting blades, or inserts, disposed at regular intervals about the circumference of the cutter head. As the cutter head rotates, the inserts strike and remove material from a work material to be shaped. The cutter head and the insert have a shape selected to form a desired pattern in the work material.

Figure 1:
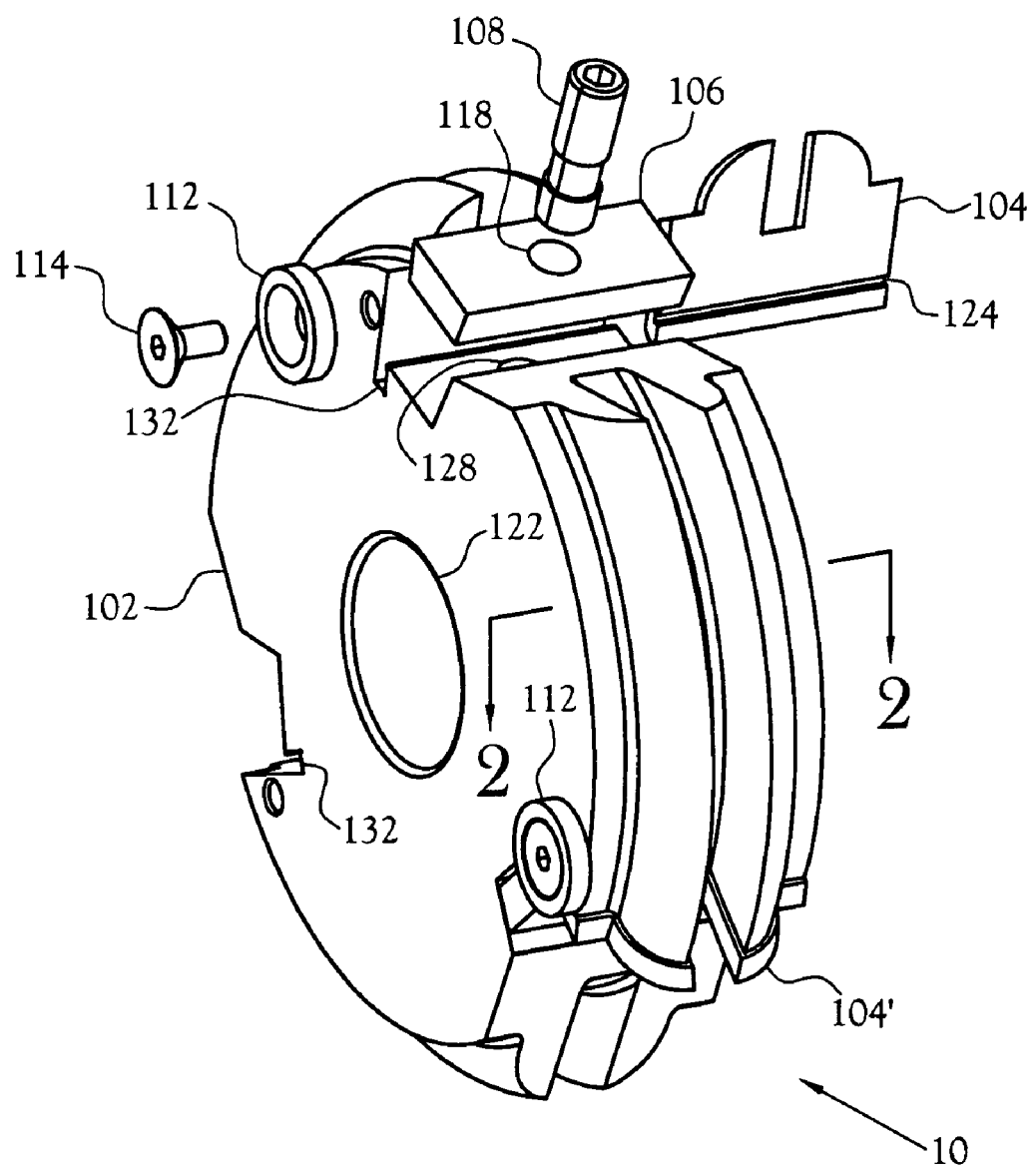
FIG. 1 is a perspective view of one embodiment of a cutter head.

FIG. 1 illustrates one embodiment of a cutter head assembly 10, including a cutter head 102 with an insert 104, a clamping member 106, and a clamping fastener 108 shown in an exploded view. In the illustrated embodiment, the cutter head 102 is adapted for three inserts 104 arranged evenly about the circumference of the cutter head 102. One insert 104 is illustrated in an exploded view, another insert 104' is illustrated in an operating position, and no insert 104 is shown for the third position.

The cutter head 102 is disc-shaped and has an arbor hole 122 in the center to which the head 102 is attached for use. In another embodiment, the cutter head 102 has a center shaft or shank that connects to a rotating driver.

Also illustrated in FIG. 1 are stops 112 for the insert 104. The stops 112 are secured with a fastener 114 to one face of the cutter head 102. A portion of each stop 112 protrudes past the slotted opening 132 into which the insert 104 slides. The stops 112 are an aid to position the insert 104 at the proper location, thereby aligning the insert 104 relative to the cutter head 102.

Figure 2:
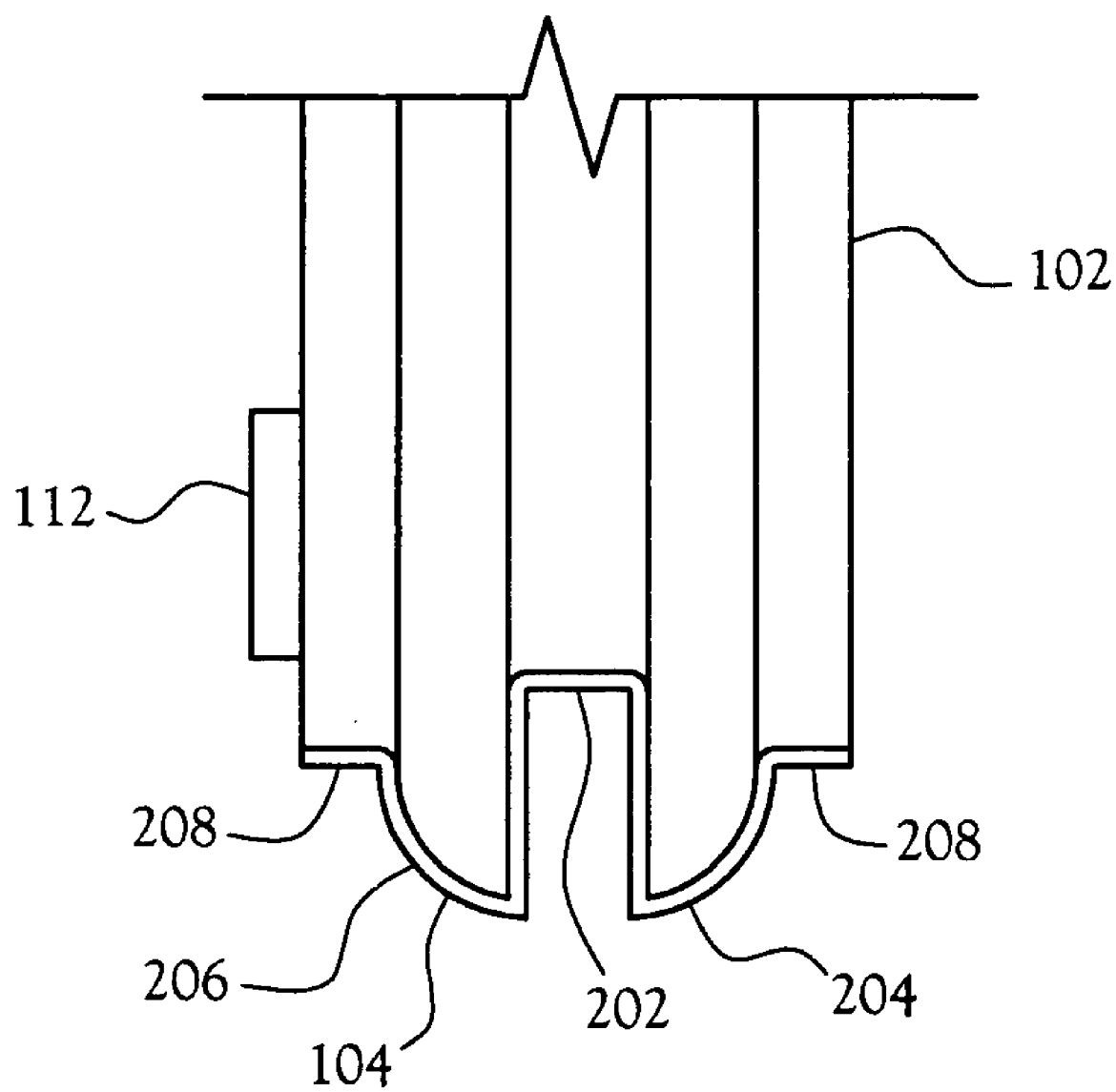
FIG. 2 is a section view of one embodiment of an insert in the cutter head.

FIG. 2 illustrates one embodiment of a shaped cutter head 102 and insert 104. As the cutter head 104 rotates, the insert 104 cuts away material from the work material to form a particular pattern. In the case of the illustrated cutter head 102 and insert 104, the pattern cut into the work material has a tongue protruding from a concave surface. To form this shape, the cutter head 102 and insert 104 have a groove 202 between two rounded protrusions 204, 206 that end in a flat surface 208. Those skilled in the art will recognize that the shape of the cutter head 102 and insert 104 can vary without departing from the spirit and scope of the present invention.

As can be seen in FIG. 2, the insert 104 protrudes beyond the circumference of the cutter head 102. The amount of the protrusion varies based on the strength of the insert 104 and the number of times it has been sharpened. In the illustrated embodiment, the cutter head 102 has a shape congruent with, but slightly smaller than that of the insert 104.

Figure 3:
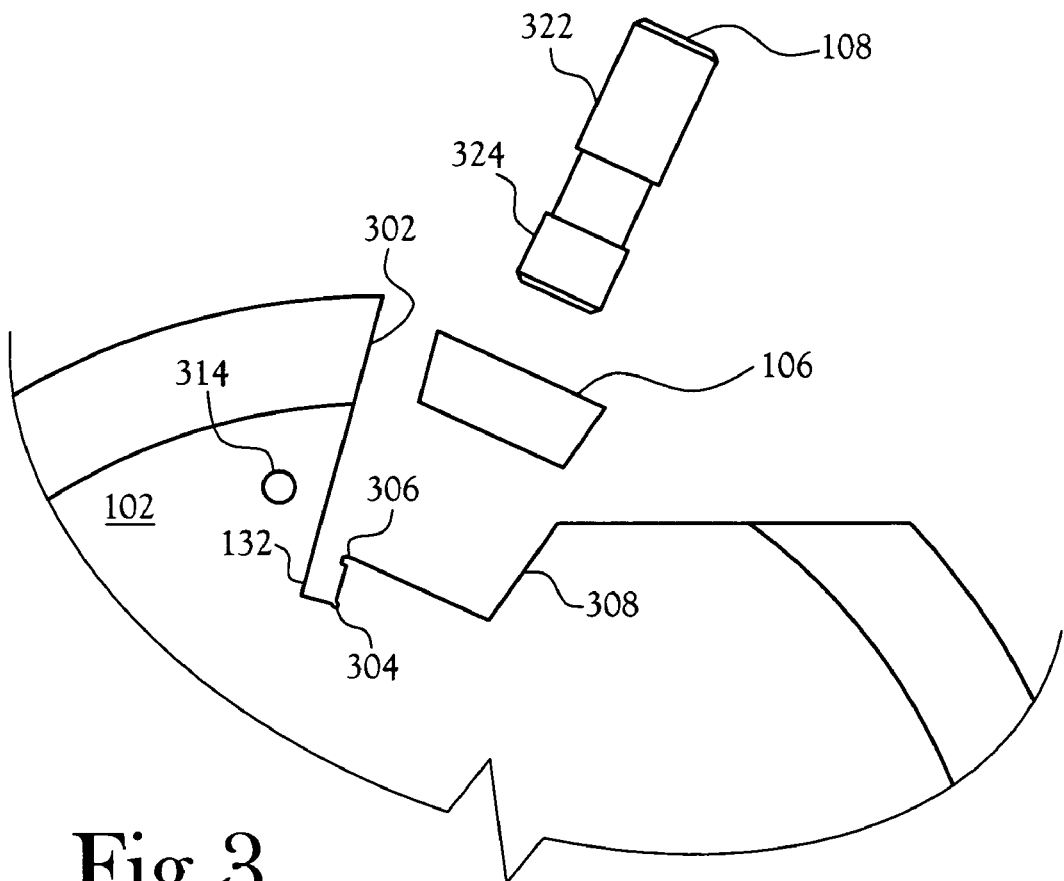
FIG. 3 is a partial view of the cutter head showing one embodiment of a clamping member.

FIG. 3 illustrates a side view of a portion of one embodiment of the cutter head 102, showing the clamping member 106 and the clamping fastener 108. In the illustrated embodiment, the cutter head 102 has a surface 302 parallel to the arbor hole 122 axis and extending substantially radially from the cutter head 102. The trailing surface of the insert 104 is adjacent this cutter head surface 302. The leading surface of the insert 104 has a groove 124 that mates with the tongue 306 protruding into the slotted opening 132. The tongue 306 locks the insert 104 in the radial direction such that the insert 104 cannot be ejected from the cutter head 102 by centrifugal force as the cutter head 102 rotates.

The insert 104 is positioned in the cutter head 102 by sliding the insert 104 parallel to the arbor hole 122 axis into the slotted opening 132 such that the insert groove 124 engages a corresponding tongue 306. The insert 104 slides into the slotted opening 132 until the edge of the insert 104 contacts the stop 112. The insert 104 is secured to the cutter head 102 in that position by rotating the clamping fastener 108, thereby forcing the clamping member between the cutter head wall 308 and the insert 104. The cutter head wall 308 forms one surface of a major slot in the cutter head 102 and the forward major surface of the insert 104 forms the opposite surface of the major slot. The major slot is also referred to as a clamping slot because the slot receives the clamping member 106. The clamping member 106 is sized to be slightly wider than the minimum distance between the cutter head wall 308 and the insert 104 in the slotted opening 132. In the illustrated embodiment, the cutter head surface 302 and cutter head wall 308 are not parallel, but the two surfaces 302, 308 form a v-shaped slot into which the wedge-shaped clamping member 106 fits.

In the illustrated embodiment, the clamping fastener 108 has two counter-rotating screw portions 322, 324 and a hex head for causing the fastener 108 to rotate. In other embodiments, the fastener 108 has other means for a user to engage the fastener 108, for example, a slotted head. The lower screw portion 324 of the clamping fastener 108 mates with a corresponding threaded opening 128 in the cutter body 102. The upper screw portion 322 mates with a corresponding threaded thru-opening 118 in the clamping member 106. The clamping member 106 is shown between the cutter head 102 and the clamping fastener 108 to illustrate the relationship of the clamping member 106 to the cutter head 102. One assembly method includes screwing the fastener 108 into the bottom of the clamping member 106. Once the threads are started, the other end of the fastener 108 is positioned adjacent the threaded opening 128 in the cutter head 102. The fastener 108 is then rotated and the clamping member 106 is drawn towards the cutter head 102 at a rate double that if the fastener 108 only mated with the cutter head 102. In another embodiment, the fastener 108 is a standard screw fastener with a head having a larger diameter than the lower screw portion 324. In this embodiment, the clamping member 106 has an opening 128 larger than the diameter of the lower screw portion 324, but a smaller diameter than the head. The clamping member 106 is forced toward the cutter head 102 by tightening the fastener 108 and drawing the clamping member 106 to the cutter head 102 and wedging the insert 104 against the clamping member 106 and a face 302 of the cutter head 102. In another embodiment, a washer is disposed between the clamping member 106 and the head of the fastener 108.

Figure 4:
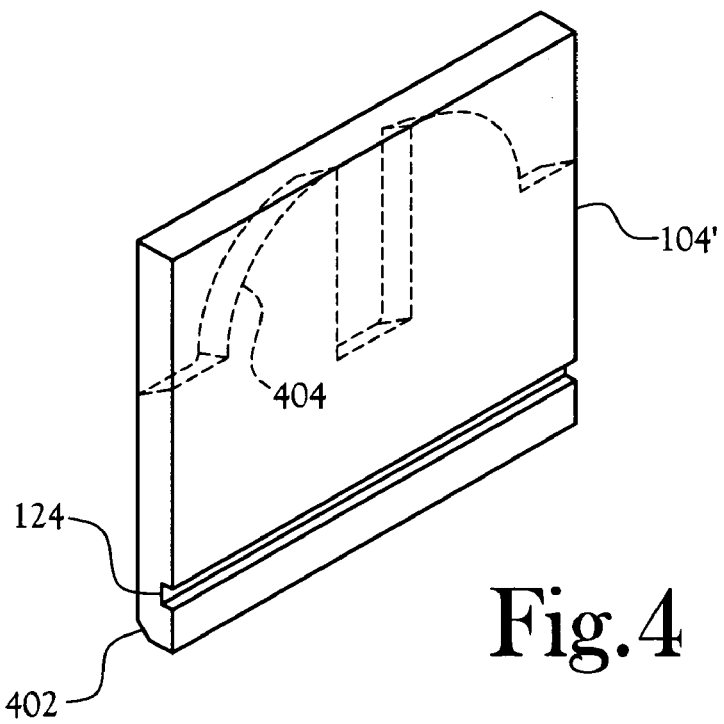
FIG. 4 is a perspective view of an insert adapted to fit in one embodiment of the cutter head.

FIG. 4 illustrates one embodiment of a blank insert 104", that is, an insert 104" that has not been formed to a particular pattern. Overlaid on the insert 104" of FIG. 4 is the outline 404 of the shape cut into the insert 104 illustrated in FIG. 1.

The insert 104" includes a groove 124 on one major surface. The groove 124 mates with the tongue 306 in the slotted opening 132. The tongue 306 and groove 124 connection prevents the insert 104 from being ejected from the slotted opening 132 when the cutter head 102 is rotating at a high speed with centrifugal force acting upon the insert 104.

One corner on the opposite surface of the insert 104" has a bevel 402. In one embodiment, the insert is formed of a hardened steel and is ground with relatively sharp cutting edges 404. The shape and configuration of the inserts 104 are precisely controlled during manufacture of the inserts 104 to facilitate assembly and alignment in the cutter head 102.

Referring to the figures, slotted opening 132 shares a surface with a face 302 of the cutter head 102. The insert 102 is slid axially, relative to the axis of the arbor hole 122, into the slotted opening 132. Also illustrated in slotted opening 132 is a groove 304 cut below the tongue 306. The groove 304 provides clearance for the corner of the insert 104 when the insert 104 is slid into the slotted opening 132. As can be seen in FIG. 4, the opposite corner of the insert 104 has a bevel 402, thereby providing additional clearance for sliding the insert 104 into the slotted opening 132.

The cutter head assembly 10 includes various functions. The function of receiving the insert 104 in a cutter head 102 is implemented by the slotted opening 132 in the cutter head 102. The function of clamping the insert 104 in the cutter head 102 is implemented, in one embodiment, by the clamping member 106 being forced between the cutter head wall 308 and the insert 104. The function of aligning the insert 104 in the cutter head 102 is implemented, in one embodiment, by a stop 112 secured with a fastener 114 to one face of the cutter head 102. The function of preventing the insert 104 from being radially ejected from the cutter head 102 is implemented by a groove 124 in the insert 104 mating with the tongue 306 in the slotted opening 132.

The function of drawing a clamping member toward the cutter head 102 is implemented, in one embodiment, by the fastener 102 forcing the clamping member 106 toward the cutter head 102. In one embodiment, the fastener 102 engages a threaded opening 128 in the cutter head 102 and a threaded opening 118 in the clamping member 106. The two threaded openings 118, 128 have opposing threads corresponding to the threads on the fastener 108. In another embodiment, the fastener 108 engages a threaded opening 128 in the cutter head 102 and a shoulder of the head of the fastener 108 engages a surface of the clamping member 106 surrounding the opening 118, thereby forcing the clamping member 106 toward the cutter head 102.

The function of wedging the insert between a clamping member 106 and the cutter head 102 is implemented, in one embodiment, by the clamping member 106 being forced between the cutter head wall 308 and the insert 104 with the clamping member 106 have a wedge shape.

From the foregoing description, it will be recognized by those skilled in the art that a cutter head assembly 10 has been provided. The cutter head assembly 10 includes a cutter head 102 with one or more clamping assemblies arranged radially about the head 102. The clamping assemblies include a clamping member 106 that fits into a clamping slot and a fastener 108 that secures the clamping member 106 to the cutter head 102, thereby securing an insert 104 to the cutter head 102. The insert 104 is secured in the cutter head 102 and is adapted to cut a material while the insert 104, in the cutter head 102, is rotated by a rotary tool.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. An apparatus for securing an insert to a cutter head, said apparatus comprising:
   a cutter head having an insert slot for receiving an insert, said insert slot having a planar face substantially parallel to an axis of rotation of said cutter head, said insert slot having a tongue adapted to engage a slot in the insert, a clamping slot oriented longitudinally in said cutter head, said clamping slot adjacent said insert slot such that a surface of the insert positioned in said insert slot forms a side surface of said clamping slot, said cutter head having a threaded aperture formed in a bottom surface of said clamping slot;
   a clamping member having a threaded thru-opening with a thread cut in an opposite direction as a thread in said threaded aperture in said cutter head, said clamping member adapted to wedge the insert in said clamping slot; and
   a fastener adapted to engage said threaded aperture in said cutter head and said threaded thru-opening in said clamping member whereby said fastener draws said clamping member toward said cutter head when rotated in a first direction and clamping the insert to said cutter head.

2. The apparatus of claim 1 further including a stop fastened to a face of said cutter head, said stop protruding past said insert slot, said stop adapted to align the insert with the insert positioned in said insert slot.

3. The apparatus of claim 1 further including a stop fastened to a face of said cutter head, said stop being secured to said cutter head by a second fastener, said stop protruding past said insert slot, said stop adapted to align the insert with the insert positioned in said insert slot.

4. The apparatus of claim 1 wherein said cutter head is disc-shaped, said cutter head having a circumference shape substantially the same as an insert shape whereby said cutter head supports a back surface of said insert during a cutting operation.

5. The apparatus of claim 1 wherein said insert slot includes a tongue protruding into said insert slot, said tongue adapted to engage a corresponding groove in the insert.

6. An apparatus for securing an insert to a cutter head, said apparatus comprising:
   a cutter head having an insert slot for receiving an insert, said insert slot having a tongue adapted to engage a slot in the insert, said cutter head including a clamping slot oriented longitudinally in said cutter head, said clamping slot adjacent said insert slot such that a surface of the insert positioned in said insert slot forms a side surface of said clamping slot, said cutter head having a threaded aperture formed in a bottom surface of said clamping slot;
   a clamping member having a thru-opening, said clamping member adapted to wedge the insert in said clamping slot; and
   a fastener engaging said threaded aperture in said cutter head, said fastener passing through said thru-opening in said clamping member, whereby said fastener draws said clamping member toward said cutter head when rotated in a first direction and clamps the insert to said cutter head.

7. The apparatus of claim 6 wherein said insert slot has a planar face substantially parallel to an axis of rotation of said cutter head.

8. The apparatus of claim 6 further including a stop fastened to a face of said cutter head, said stop protruding past said insert slot, said stop adapted to align the insert with the insert positioned in said insert slot.

9. The apparatus of claim 6 further including a stop fastened to a face of said cutter head, said stop being secured to said cutter head by a second fastener, said stop protruding past said insert slot, said stop adapted to align the insert with the insert positioned in said insert slot.

10. The apparatus of claim 6 wherein said cutter head is disc-shaped, said cutter head rotating about an axis.

11. The apparatus of claim 6 wherein said insert slot includes a tongue protruding into said insert slot, said tongue adapted to engage a corresponding groove in the insert.

12. The apparatus of claim 6 wherein said insert slot includes a tongue protruding into said insert slot and a groove in a corner of said insert slot proximate said tongue.

13. The apparatus of claim 6 wherein said cutter head is disc-shaped, said cutter head having a circumference shape substantially the same as an insert shape whereby said cutter head supports a back surface of said insert during a cutting operation.

14. The apparatus of claim 6 wherein said clamping member thru-opening is threaded with an opposing thread compared to said threaded aperture in said cutter head, said fastener adapted to engage said threaded aperture in said cutter head and said thru-opening in said clamping member whereby said fastener draws said clamping member toward said cutter head when rotated in a first direction and clamping the insert to said cutter head.

15. An insert for cutting a material by rotating with a rotary tool, said insert comprising:
   a metal blank having a first major surface substantially parallel to a second major surface, said first major surface adapted to engage a clamping member, said second major surface adapted to engage a cutter head surface whereby said metal blank is wedged between said clamping member and said cutter head surface, said metal blank including:
      a groove in said first major surface adapted to receive a tongue protruding into an insert slot in a cutter head, said insert slot oriented substantially parallel to an axis of rotation of said cutter head, and
      a bevel on a first corner of said metal blank, said bevel intersecting said second major surface at a first end of said metal blank proximate said groove.

* * * * *